US012696289B2

(12) United States Patent
Wang

(10) Patent No.: US 12,696,289 B2
(45) Date of Patent: Jul. 28, 2026

(54) METHOD FOR PDSCH RESOURCE DETERMINATION AND RELATED PRODUCTS

(71) Applicant: BEIJING UNISOC COMMUNICATIONS TECHNOLOGY CO., LTD., Beijing (CN)

(72) Inventor: Hualei Wang, Beijing (CN)

(73) Assignee: BEIJING UNISOC COMMUNICATIONS TECHNOLOGY CO., LTD., Beijing (CN)

( * ) Notice: Subject to any disclaimer, the term of this patent is extended or adjusted under 35 U.S.C. 154(b) by 646 days.

(21) Appl. No.: 18/029,246

(22) PCT Filed: Sep. 23, 2021

(86) PCT No.: PCT/CN2021/119909
§ 371 (c)(1),
(2) Date: Mar. 29, 2023

(87) PCT Pub. No.: WO2022/068667
PCT Pub. Date: Apr. 7, 2022

(65) Prior Publication Data
US 2023/0379934 A1 Nov. 23, 2023

(30) Foreign Application Priority Data

Sep. 29, 2020 (CN) .......................... 202011054717.6

(51) Int. Cl.
*H04W 72/232* (2023.01)
*H04L 5/00* (2006.01)

(52) U.S. Cl.
CPC ......... *H04W 72/232* (2023.01); *H04L 5/0048* (2013.01); *H04L 5/0053* (2013.01)

(58) Field of Classification Search
CPC ... H04W 72/232; H04L 5/0048; H04L 5/0053
See application file for complete search history.

(56) References Cited

U.S. PATENT DOCUMENTS

2019/0222400 A1 7/2019 Bagheri et al.
2019/0342030 A1 11/2019 Hosseini et al.
(Continued)

FOREIGN PATENT DOCUMENTS

CN 110519027 A 11/2019
CN 110830156 A 2/2020
CN 111164924 A 5/2020

OTHER PUBLICATIONS

CATT, Corrections on rate matching, 3GPP Draft, R1-1808382, Aug. 10, 2018.
(Continued)

*Primary Examiner* — Samina F Choudhry
(74) *Attorney, Agent, or Firm* — BROOKS KUSHMAN P.C.

(57) ABSTRACT

A method for physical downlink data channel (PDSCH) resource determination and related products are provided. The method is applied to user equipment (UE) and includes: resources of n physical downlink control channels (PDCCH) and demodulation reference signal (DMRS) resource sets associated with the n PDCCHs are not to be used for a PDSCH, if the PDSCH is scheduled by the n PDCCH, at least one PDCCH among the n PDCCHs is detected by the UE, and the PDSCH overlaps with at least one control resource set (CORESET) resource among CORESET resource(s) associated with the n PDCCHs.

20 Claims, 4 Drawing Sheets

(56)     References Cited

U.S. PATENT DOCUMENTS

| | | |
|---|---|---|
| 2020/0022168 A1 | 1/2020 | Xu et al. |
| 2020/0154467 A1* | 5/2020 | Gong .................... H04L 5/0055 |
| 2020/0260449 A1 | 8/2020 | Suzuki et al. |
| 2021/0282042 A1* | 9/2021 | Park ...................... H04W 56/00 |

OTHER PUBLICATIONS

WIPO, International Search Report and Written Opinion for International Application No. PCT/CN2021/119909, Dec. 6, 2021.

The extended European search report issued in corresponding EP application No. 21874328.4 dated Mar. 14, 2024.

Ericsson, Remaining details on DMRS design, 3GPP TSG RAN WG1 Meeting 90bis, R1-1718448, Oct. 9-13, 2017.

The first office action issued in corresponding CN application No. 202011054717.6 dated Mar. 14, 2024.

* cited by examiner

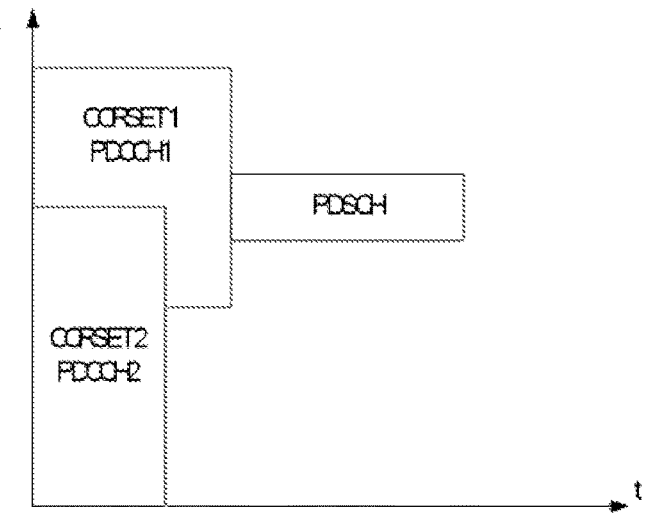
FIG. 2B
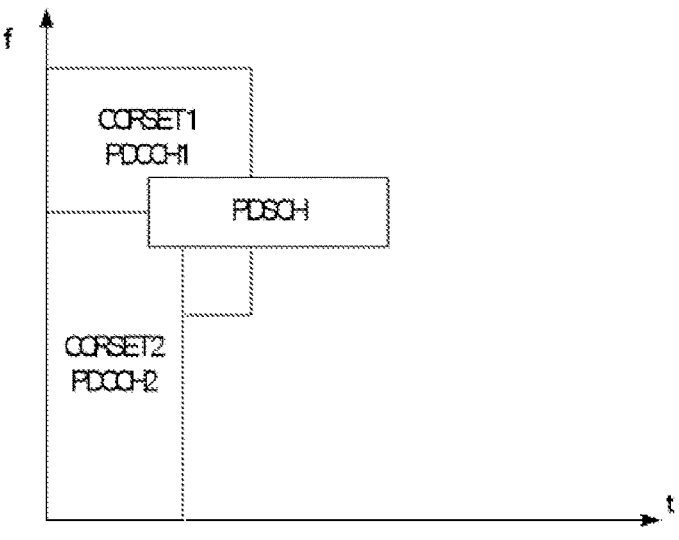
FIG. 2C
S300
RESOURCES OF N PDCCHS AND DMRS RESOURCE SETS ASSOCIATED WITH THE N PDCCHS ARE NOT TO BE USED FOR A PDSCH, IF THE PDSCH IS SCHEDULED BY THE N PDCCH, AT LEAST ONE PDCCH AMONG THE N PDCCHS IS DETECTED BY THE UE, AND THE PDSCH OVERLAPS WITH AT LEAST ONE CORESET RESOURCE AMONG CORESET RESOURCES ASSOCIATED WITH THE N PDCCHS
FIG. 3

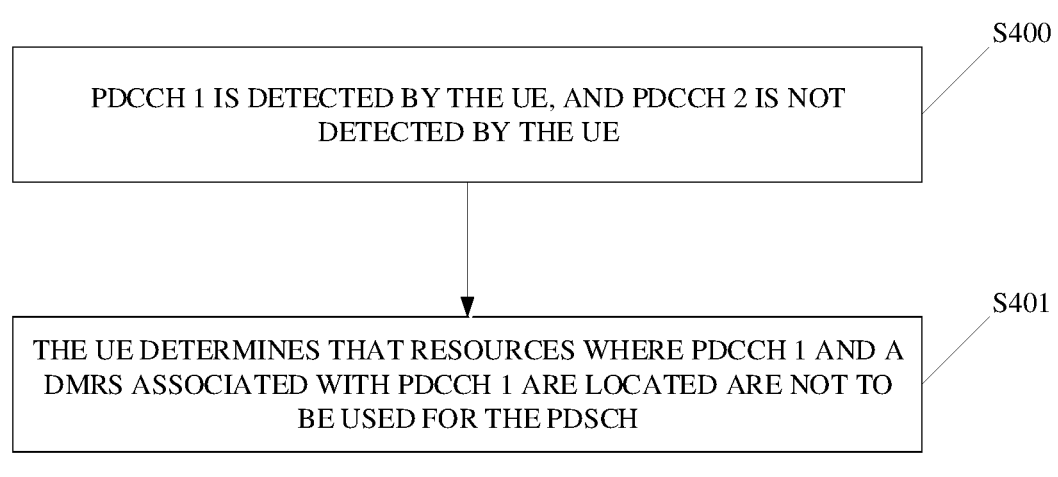

S400

PDCCH 1 IS DETECTED BY THE UE, AND PDCCH 2 IS NOT DETECTED BY THE UE

S401

THE UE DETERMINES THAT RESOURCES WHERE PDCCH 1 AND A DMRS ASSOCIATED WITH PDCCH 1 ARE LOCATED ARE NOT TO BE USED FOR THE PDSCH

FIG. 4

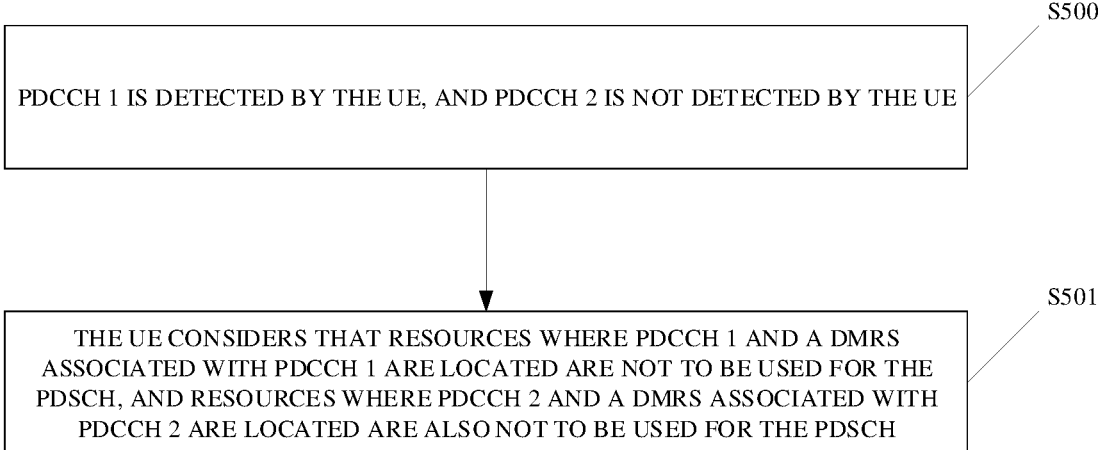

S500

PDCCH 1 IS DETECTED BY THE UE, AND PDCCH 2 IS NOT DETECTED BY THE UE

S501

THE UE CONSIDERS THAT RESOURCES WHERE PDCCH 1 AND A DMRS ASSOCIATED WITH PDCCH 1 ARE LOCATED ARE NOT TO BE USED FOR THE PDSCH, AND RESOURCES WHERE PDCCH 2 AND A DMRS ASSOCIATED WITH PDCCH 2 ARE LOCATED ARE ALSO NOT TO BE USED FOR THE PDSCH

FIG. 5

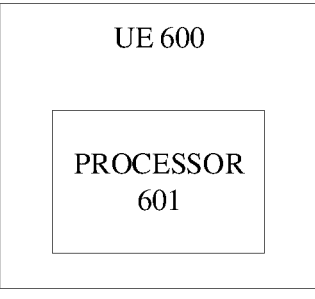

UE 600

PROCESSOR 601

FIG. 6

METHOD FOR PDSCH RESOURCE DETERMINATION AND RELATED PRODUCTS

CROSS-REFERENCE TO RELATED APPLICATION(S)

This application is a National Stage of International Application No. PCT/CN2021/119909, field Sep. 23, 2021, which claims priority to Chinese Patent Application No. 202011054717.6, filed Sep. 29, 2020, the disclosures of which are hereby incorporated by reference in their entirety.

TECHNICAL FIELD

The disclosure relates to the field of communication processing technologies, and more particularly, to a method for physical downlink data channel (PDSCH) resource determination and related products.

BACKGROUND

A physical downlink shared channel (PDSCH) is a kind of downlink (DL) data channel and mainly carries DL data.

A physical downlink control channel (PDCCH) carries scheduling and other control information, specifically including resource allocation, uplink (UL) grant, power control, and UL retransmission information.

In an existing network, there may be inconsistency between user equipment (UE) and the base station device in the confirmation of PDSCH resources, thus reducing the network performance.

SUMMARY

In a first aspect, a method for physical downlink data channel (PDSCH) resource determination is provided. The method is applied to user equipment (UE) and includes: resources of n physical downlink control channels (PDCCH) and demodulation reference signal (DMRS) resource sets associated with the n PDCCHs are not to be used for a PDSCH, if the PDSCH is scheduled by the n PDCCH, at least one PDCCH among the n PDCCHs is detected by the UE, and the PDSCH overlaps with at least one control resource set (CORESET) resource among CORESET resource(s) associated with the n PDCCHs, where n is an integer greater than or equal to 2.

In a second aspect, a terminal is provided. The terminal includes a processor, a memory, and a communication interface. The memory is configured to store one or more programs. The processor is configured to invoke and execute the one or more programs to perform the method described in the first aspect.

In a third aspect, a computer-readable storage medium is provided. The computer-readable storage medium stores computer programs which are operable with a computer to perform the method described in the first aspect.

BRIEF DESCRIPTION OF THE DRAWINGS

The drawings used in implementations of the disclosure are introduced below.

FIG. 2B is a schematic diagram of another PDSCH resource provided in the disclosure.

FIG. 2C is a schematic diagram of another PDSCH resource provided in the disclosure.

FIG. 3 is a schematic flowchart of a method for PDSCH resource determination provided in the disclosure.

FIG. 4 is a schematic flowchart of a method for PDSCH resource determination provided in implementation 1 of the disclosure.

FIG. 5 is a schematic flowchart of a method for PDSCH resource determination provided in implementation 2 of the disclosure.

FIG. 6 is a schematic structural diagram of user equipment (UE) provided in implementations of the disclosure.

DETAILED DESCRIPTION

Implementations of the disclosure are described below with reference to the drawings in implementations of the disclosure.

The term "and/or" herein describes only an association relationship for describing associated objects and represents that three relationships may exist. For example, A and/or B may represent the following three cases: only A exists, both A and B exist, and only B exists. In addition, the character "/" herein indicates an "or" relationship between the associated objects.

The "multiple" in implementations of the disclosure refers to two or more. The descriptions of "first", "second", and the like in implementations of the disclosure are merely for illustration and to distinguish and describe objects rather than limit the order or the number of devices in implementations of the disclosure, and do not constitute any limitation to implementations of the disclosure. The "connection" in implementations of the disclosure refers to various connections such as direct connection or indirect connection to realize communication between devices, which is not limited herein.

Figures 1, 2A:
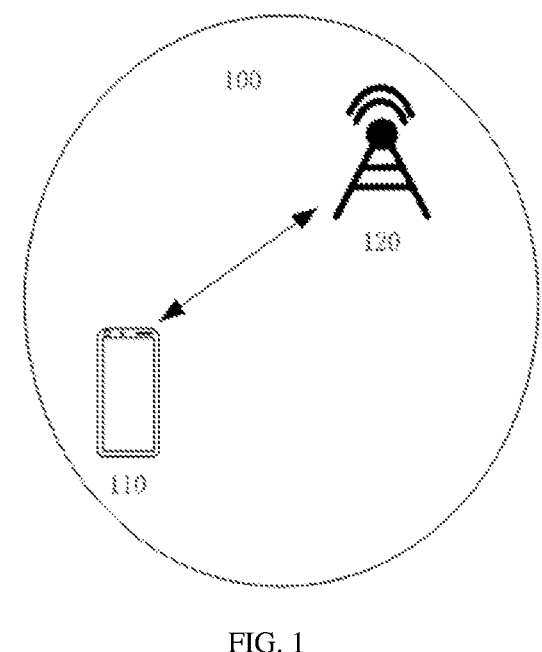
FIG. 1 is a system architecture diagram of an example communication system provided in the disclosure.
FIG. 2A is a schematic diagram of a physical downlink data channel (PDSCH) resource provided in the disclosure.

The technical solution of implementations of the disclosure may be applied to an example communication system 100 illustrated in FIG. 1. The example communication system 100 includes a terminal 110 and a network device 120. The terminal 110 is in communication connection with the network device 120.

The example communication system 100 may be, for example, a global system of mobile communication (GSM), a code division multiple access (CDMA) system, a wideband code division multiple access (WCDMA) system, a general packet radio service (GPRS) system, a long term evolution (LTE) system, an advanced LTE (LTE-A) system, a new radio (NR) system, an evolved system of the NR system, an LTE-based access to unlicensed spectrum (LTE-U) system, an NR-based access to unlicensed spectrum (NR-U) system, a universal mobile telecommunication system (UMTS), a next-generation communication system, or other communication systems, etc.

Generally speaking, a conventional communication system generally supports a limited number of connections and therefore is easy to implement. However, with development of communication technology, a mobile communication system will not only support conventional communication but also support, for example, device to device (D2D) communication, machine to machine (M2M) communication, machine type communication (MTC), and vehicle to vehicle (V2V) communication. Implementations of the disclosure are also applicable to these communication systems. Optionally, a communication system in implementations of the disclosure may be applied to a carrier aggregation (CA) scenario, a dual connectivity (DC) scenario, or a standalone (SA) network deployment scenario.

The terminal 110 in implementations of the disclosure may be referred to as user equipment (UE), an access terminal, a subscriber unit, a subscriber station, a mobile station, a remote station, a remote terminal, a mobile device, a user terminal, a terminal, a wireless communication device, a user agent, or a user device. The terminal may also be a cellular phone, a cordless phone, a session initiation protocol (SIP) phone, a wireless local loop (WLL) station, a personal digital assistant (PDA), a handheld device with wireless communication functions, a computing device, other processing devices coupled with a wireless modem, a relay device, an in-vehicle device, a wearable device, a terminal in a future 5th-generation (5G) network, a terminal in a future evolved public land mobile network (PLMN), etc., which is not limited herein.

The network device 120 in implementations of the disclosure may be a device that communicates with the terminal. The network device may be an evolved NodeB (eNB or eNodeB) in the LTE system, or a radio controller in a cloud radio access network (CRAN). Alternatively, the network device may be a relay device, an access point, an in-vehicle device, a wearable device, a network device in the future 5G network or a network device in the future evolved PLMN, an antenna panel or a group of antenna panels (including multiple antenna panels) of a base station in the 5G system, or may be a network node forming a gNB or a transmission point, such as a baseband unit (BBU) or a distributed unit (DU), which is not limited herein.

In some deployments, the gNB may include a centralized unit (CU) and a DU. The gNB may further include an active antenna unit (AAU). The CU implements some functions of the gNB, and the DU implements some other functions of the gNB. For example, the CU is responsible for processing non-real-time protocols and services, and implements functions of a radio resource control (RRC) layer and functions of a packet data convergence protocol (PDCP) layer. The DU is responsible for processing physical (PYH) layer protocols and real-time services, and implements functions of a radio link control (RLC) layer, functions of a media access control (MAC) layer, and functions of a PHY layer.

In the PDCCH enhancement between the terminal and the network device in the communication system as illustrated in FIG. 1, PDCCH repeated scheduling in the frequency domain is a possible candidate solution. As illustrated in FIG. 2A, a possible PDCCH repeated scheduling is illustrated in FIG. 2A. Referring to FIG. 2A, a resource where PDCCH 1 is located and a resource where PDCCH 2 is located belong to different control resource set (CORESET) resources. That is, the resource where PDCCH 1 is located belongs to CORESET 1 and the resource where PDCCH 2 is located belongs to CORESET 2. PDCCH 1 and PDCCH 2 are repetitions of a PDCCH. That is, at least downlink control information (DCI) carried by PDCCH 1 and a DCI carried by PDCCH 2 schedule a same PDSCH resource. As illustrated in FIG. 2A, the PDSCH overlaps with a CORE-SET resource where PDCCH 1 is located.

Therefore, in an optional solution, if merely PDCCH 1 is detected by the UE and PDCCH 2 is not detected by the UE, the UE may consider that resources where PDCCH 1 and a demodulation reference signal (DMRS) associated with PDCCH 1 are located are not to be used for the PDSCH, i.e., as illustrated in FIG. 2B.

Therefore, in another optional solution, if merely PDCCH 2 is detected by the UE and PDCCH 1 is not detected by the UE, the UE may consider that a resource as illustrated in FIG. 2A is to be used for the PDSCH.

As can be seen from the above, different PDCCH states resolved by the UE may lead to different cognition of the UE, i.e., different resources occupied by the PDSCH, which may result in the inconsistency of understanding between the gNB and the UE, thus reducing the network performance.

Referring to FIG. 3, FIG. 3 provides a method for PDSCH resource determination. The method illustrated in FIG. 3 can be performed by the terminal in the communication system as illustrated in FIG. 1. The terminal can specifically be a UE, and the UE may specifically include a device with communication functions such as a smart phone, a tablet computer, a PDA, a smart watch, etc. The communication may support multiple protocols, the specific communication protocol supported by the UE is not limited herein. The method is as illustrated in FIG. 3 and includes the following steps.

Step S300, resources of n PDCCHs and DMRS resource sets associated with the n PDCCHs are not to be used for a PDSCH, if the PDSCH is scheduled by the n PDCCH, at least one PDCCH among the n PDCCHs is detected by the UE, and the PDSCH overlaps with at least one CORESET resource among CORESET resource(s) associated with the n PDCCHs.

n may be an integer greater than or equal to 2. Specifically, n may be 2, 3, 4, etc.

The at least one PDCCH among the n PDCCHs being detected by the UE may specifically include: one PDCCH among the n PDCCHs being detected by the UE, and remaining PDCCHs among the n PDCCHs being not detected by the UE, or m PDCCHs among the n PDCCHs being detected by the UE, and remaining n-m PDCCHs among the n PDCCHs being not detected by the UE, where n is greater than or equal to 2, and m is greater than or equal to 1 and less than n, or all PDCCHs among the n PDCCHs being detected by the UE.

The CORESET resources associated with the n PDCCHs may specifically include the following. Each of the n PDCCHs is associated with a CORESET resource, and the CORESET resources may be n CORESET resources. That is, one PDCCH is associated with one CORESET resource. In practical applications, multiple PDCCHs among the n PDCCHs may be associated with the same CORESET resource. For example, two PDCCHs may be associated with one CORESET resource. Alternatively, the n PDCCHs may be associated with one CORESET resource. A specific form of the CORESET resources is not limited herein.

In the technical solution provided in the disclosure, when the PDSCH is scheduled by the n PDCCHs, the UE can detect at least one PDCCH among the n pieces of PDCCH scheduling, and the PDSCH overlaps with at least one CORESET resource among the CORESET resources associated with the n PDCCHs, then the resources of the n PDCCHs and the DMRS resource sets associated with the n PDCCHs are not to be used for the PDSCH. That is, a resource as illustrated in FIG. 2B is to be used for the PDSCH. In the technical solution of the disclosure, the resources of the n PDCCHs and the DMRS resource sets associated with the n PDCCHs are not to be used regardless of which PDCCH or PDCCHs among the n pieces of PDCCH scheduling is detected. Therefore, the resource to be used for the PDSCH is uniquely determined. That is, the resource as illustrated in FIG. 2B is to be adopted. In this way, the cognition inconsistency between the UE and the base station device can be avoided, and the network performance can be improved.

In an optional solution, the PDSCH overlapping with the at least one CORESET resource among the CORESET resources associated with the n PDCCHs may specifically include: the PDSCH overlapping with one CORESET resource in CORESETs associated with the n PDCCHs, and the PDSCH not overlapping with remaining CORESET resources in the CORESETs associated with the n PDCCHs, or the PDSCH overlapping with the CORESET resources associated with the n PDCCHs, that is, if multiple CORESET resources are associated with the n PDCCHs, the PDSCH overlaps with the multiple CORESET resources.

Implementation 1

Implementation 1 of the disclosure provides a method for resource determination. The method can be performed by the terminal in the communication system as illustrated in FIG. 1. The technical scenario for implementing implementations of the disclosure is as follows. In this implementation, the n PDCCHs are two PDCCHs, which are referred to as PDCCH 1 and PDCCH 2 herein for the convenience of description. The resource where PDCCH 1 is located and the resource where PDCCH 2 is located belong to different CORESET resources, and PDCCH 1 and PDCCH 2 are repetitions of a PDCCH. That is, at least a DCI carried by PDCCH 1 and a DCI carried by PDCCH 2 schedule a same PDSCH resource. The PDSCH overlaps with a CORESET resource where PDCCH 1 is located, and does not overlap with a CORSET resource where PDCCH 2 is located. The method is as illustrated in FIG. 4 and includes the following steps.

Step S400, PDCCH 1 is detected by the UE, and PDCCH 2 is not detected by the UE.

Step S401, the UE determines that resources where PDCCH 1 and a DMRS associated with PDCCH 1 are located are not to be used for the PDSCH. That is, the resource as illustrated in FIG. 2B is to be used for the PDSCH.

In an optional solution, step S400 may also be replaced by other steps, for example: step S400-1, PDCCH 2 is detected by the UE, and PDCCH 1 is not detected by the UE, or step S400-2, PDCCH 1 and PDCCH 2 are detected by the UE.

In implementations provided in the disclosure, when the PDSCH is scheduled by two PDCCHs, the UE can detect at least one PDCCH among the two pieces of PDCCH, and the PDSCH overlaps with the CORESET resource associated with PDCCH 1, then a DMRS resource set associated with the PDCCH 1 resource is not to be used for the PDSCH. That is, the resource as illustrated in FIG. 2B is to be used for the PDSCH. In the technical solution of the disclosure, the DMRS resource sets associated with the two PDCCH resources are not to be used regardless of which or all PDCCHs among the n pieces of PDCCH scheduling is detected. Therefore, in the technical scenario of implementation 1, the resource to be used for the PDSCH is uniquely determined. That is, the resource as illustrated in FIG. 2B is to be adopted. In this way, the cognition inconsistency between the UE and the base station device can be avoided, and the network performance can be improved.

Implementation 2

Implementation 2 of the disclosure provides a method for resource determination. The method can be performed by the terminal in the communication system as illustrated in FIG. 1. The technical scenario for implementing implementations of the disclosure is as follows. In this implementation, the n PDCCHs are two PDCCHs, which are referred to as PDCCH 1 and PDCCH 2 herein for the convenience of description. The resource where PDCCH 1 is located and the resource where PDCCH 2 is located belong to different CORESET resources, and PDCCH 1 and PDCCH 2 are repetitions of a PDCCH. That is, at least a DCI carried by PDCCH 1 and a DCI carried by PDCCH 2 schedule a same PDSCH resource. The PDSCH overlaps with a CORESET resource where PDCCH 1 is located, and overlaps with a CORSET resource where PDCCH 2 is located, as illustrated in FIG. 2C. The method is as illustrated in FIG. 5 and includes the following steps.

Step S500, PDCCH 1 is detected by the UE, and PDCCH 2 is not detected by the UE.

Step S501, the UE considers that resources where PDCCH 1 and a DMRS associated with PDCCH 1 are located are not to be used for the PDSCH, and resources where PDCCH 2 and a DMRS associated with PDCCH 2 are located are also not to be used for the PDSCH. That is, a resource as illustrated in FIG. 2B is to be used for the PDSCH.

In optional implementations, step S500 may also be replaced by step S400-1 or step S400-2.

In implementations provided in the disclosure, when the PDSCH is scheduled by two PDCCHs, the UE can detect at least one PDCCH among the two pieces of PDCCH, and the PDSCH overlaps with the CORESET resource associated with PDCCH 1 and the CORESET resource associated with PDCCH 2, then the PDCCH 1 resource and a DMRS resource set associated with the PDCCH 1 resource are not to be used for the PDSCH, and the PDCCH 2 resource and a DMRS resource set associated with the PDCCH 2 resource are also not to be used for the PDSCH. That is, the resource as illustrated in FIG. 2B is to be used for the PDSCH. In the technical solution of the disclosure, the two PDCCH resources and the DMRS resource sets associated with the two PDCCH resources are not to be used regardless of which or all PDCCHs among the two pieces of PDCCH scheduling is detected. Therefore, in the technical scenario of implementation 2, the resource to be used for the PDSCH is uniquely determined. That is, the resource as illustrated in FIG. 2B is to be adopted. In this way, the cognition inconsistency between the UE and the base station device can be avoided, and the network performance can be improved.

Implementations of the disclosure further provide an apparatus for PDSCH resource determination. The apparatus includes a processing unit. The processing unit is configured to not use resources of n PDCCHs and DMRS resource sets associated with the n PDCCHs for a PDSCH, if the PDSCH is scheduled by the n PDCCH, at least one PDCCH among the n PDCCHs is detected, and the PDSCH overlaps with at least one CORESET resource among CORESET resource(s) associated with the n PDCCHs.

According to the apparatus for PDSCH resource determination provided in the disclosure, when the PDSCH is scheduled by the n PDCCHs, the UE can detect at least one PDCCH among the n pieces of PDCCH scheduling, and the PDSCH overlaps with at least one CORESET resource among the CORESET resources associated with the n PDCCHs, then the resources of the n PDCCHs and the DMRS resource sets associated with the n PDCCHs are not to be used for the PDSCH. That is, a resource as illustrated in FIG. 2B is to be used for the PDSCH. In the technical solution of the disclosure, the resources of the n PDCCHs and the DMRS resource sets associated with the n PDCCHs are not to be used regardless of one or several PDCCHs among the n pieces of PDCCH scheduling is detected. Therefore, the resource to be used for the PDSCH is uniquely determined. That is, the resource as illustrated in FIG. 2B is to be adopted. In this way, the cognition inconsistency between the UE and the base station device can be avoided, and the network performance can be improved.

It can be understood that, in order to implement the above functions, the UE includes hardware and/or software modules corresponding to respective functions. In combination with the algorithm steps of examples described in implementations disclosed herein, the disclosure can be implemented in hardware or a combination of hardware and computer software. Whether a function is implemented by hardware or hardware driven by the computer software depends on the particular application and design constraints of the technical solution. Those skilled in the art may use different methods to implement the described functions for each particular application in combination with implementations, but such implementation should not be considered as beyond the scope of the disclosure.

According to implementations, functional modules of the electronic device may be divided according to the above method examples. For example, each functional module may be divided according to each function, and two or more functions may be integrated in one processing module. The above integrated module may be implemented in the form of hardware. It should be noted that the division of modules in implementations is schematic, and is merely a logical function division, and there may be other division manners in actual implementation.

In the case of dividing each functional module according to each function, FIG. 6 is a schematic diagram of a UE. As illustrated in FIG. 6, the UE 600 may include a processor 601.

The processor 601 may be configured to support the UE to perform the step 300, etc., and/or other processes for the technologies described herein.

It should be noted that all relevant content of the steps involved in the above method implementations can be cited in function descriptions of corresponding function modules, which will not be repeated herein.

The UE provided in implementations is configured to perform the method illustrated in FIG. 3, so as to achieve the same effect as the above implementation methods.

In the case of using the integrated unit, the UE may include a processing module, a storage module, and a communication module. The processing module may be configured to control and manage actions of the UE, for example, may be configured to support the electronic device to perform the steps performed by the processor 601. The memory module can be configured to support the electronic device to execute stored program codes and data, and the like. The communication module can be configured to support the communication between the electronic device and other devices.

The processing module may be a processor or a controller. The processing module can implement or execute the various illustrative logical blocks, modules, and circuits described in combination with the disclosure. The processor may also be a combination of computing functions, for example, a combination of one or more microprocessors, a combination of digital signal processing (DSP) and a microprocessor, and the like. The storage module may be a memory. Specifically, the communication module may be a device that interacts with other electronic devices, such as a radio frequency (RF) circuit, a Bluetooth chip, and a Wi-Fi chip.

It can be understood that the interface connection relationship between modules illustrated in implementations of the disclosure is merely for schematic illustration, and does not constitute a structural limitation on the UE. In other implementations of the disclosure, the UE may also adopt different interface connection modes in the foregoing implementations, or a combination of multiple interface connection modes.

Figure 7:
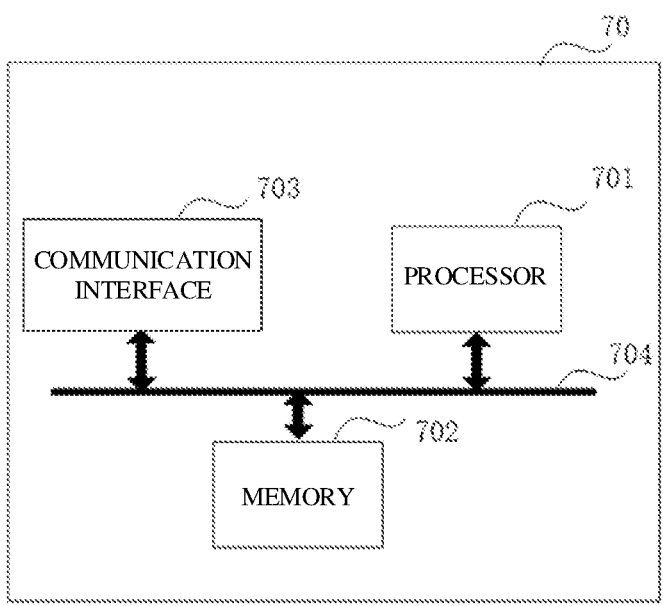
FIG. 7 is a schematic structural diagram of a terminal provided in implementations of the disclosure.

Referring to FIG. 7, FIG. 7 illustrates a terminal 70 provided in implementations of the disclosure. The terminal 70 includes a processor 701, a memory 702, and a communication interface 703. The processor 701, the memory 702, and the communication interface 703 are connected with one another via a bus 704.

The memory 702 includes but is not limited to a random access memory (RAM), a read-only memory (ROM), a erasable programmable ROM (EPROM), or a compact disc ROM (CD-ROM). The memory 702 is configured for related computer programs and data. The communication interface 703 is configured to receive and transmit data.

The processor 701 may be one or more central processing units (CPU). In a case where the processor 701 is a CPU, the CPU may be a single-core CPU or a multi-core CPU.

The processor 701 may include one or more processing units. For example, the processing unit may include an application processor (AP), a modem processor, a graphics processing unit (GPU), an image signal processor (ISP), a controller, a video codec, a digital signal processor (DSP), a baseband processor, and/or a neural-network processing unit (NPU), etc. Different processing units may be independent components, or may be integrated in one or more processors. In some implementations, the UE may also include one or more processing units. The controller can generate an operation control signal according to the instruction operation code and the timing signal, and complete the control of fetching and executing the instruction. In some other implementations, a memory may also be set in the processing unit for storing instructions and data. Exemplarily, the memory in the processing unit may be a cache memory. The memory can hold instructions or data that have just been used or recycled by the processing unit. If the processing unit needs to use the instruction or data again, the instruction or data can be invoked directly from the memory. In this way, repeated access is avoided, and the waiting time of the processing unit is reduced, thereby improving the efficiency of the UE in processing data or executing instructions.

In some implementations, the processor 701 may include one or more interfaces. The interface may include an inter-integrated circuit (I2C) interface, an inter-integrated circuit sound (I2S) interface, a pulse code modulation (PCM) interface, a universal asynchronous receiver/transmitter (UART) interface, a mobile industry processor interface (MIPI), a general-purpose input/output (GPIO) interface, a SIM card interface, and/or a USB interface, etc. The USB interface is an interface conforming to the USB standard specification. Specifically, the USB interface may be a mini USB interface, a micro USB interface, a USB type C interface, and the like. The USB interface can be configured to connect a charger to charge the UE, and can also be configured to transmit data between the UE and peripheral equipment. The USB interface can also be configured to connect a headset and play audio through the headset.

The processor 701 in the terminal 70 is configured to read computer program codes stored in the memory 702 to perform the following operations. Resources of n PDCCHs and DMRS resource sets associated with the n PDCCHs are not to be used for a PDSCH, if the PDSCH is scheduled by the n PDCCH, at least one PDCCH among the n PDCCHs is detected by the UE, and the PDSCH overlaps with at least one CORESET resource among CORESET resource(s) associated with the n PDCCHs, where n is an integer greater than or equal to 2.

All relevant content of the scenarios involved in the above method implementations can be cited in function descriptions of corresponding function modules, which will not be repeated herein.

Implementations of the disclosure further provide a chip system. The chip system includes at least one processor, a memory, and an interface circuit. The memory, the transceiver, and the at least one processor are interconnected through lines. The at least one memory is configured to store computer programs. The computer programs are operable with the processor to perform the method flows illustrated in FIGS. 3, 4, and 5.

Implementations of the disclosure further provide a computer-readable storage medium. The computer-readable storage medium stores computer programs. When running on a network device, the computer programs are configured to perform the method flows illustrated in FIGS. 3, 4, and 5.

Implementations of the disclosure further provide a computer program product. When running on a terminal, the computer program product is configured to perform the method flows illustrated in FIGS. 3, 4, and 5.

Implementations of the disclosure further provide a terminal. The terminal includes a processor, a memory, and a communication interface. The memory is configured to store one or more programs. The one or more programs are configured to be executed by the processor. The programs include instructions for performing the method of implementations illustrated in FIGS. 3, 4, and 5.

The foregoing solution of the implementations of the disclosure is mainly described from the viewpoint of execution process of the method. It can be understood that, in order to implement the above functions, the electronic device includes hardware structures and/or software modules corresponding to the respective functions. Those skilled in the art should readily recognize that, in combination with the example units and scheme steps described in the implementations provided herein, the present disclosure can be implemented in hardware or a combination of the hardware and computer software. Whether a function is implemented by way of the hardware or hardware driven by the computer software depends on the particular application and design constraints of the technical solution. Those skilled in the art may use different methods to implement the described functions for each particular application, but such implementation should not be considered as beyond the scope of the present disclosure.

According to the implementations of the disclosure, functional units may be divided for the electronic device in accordance with the foregoing method examples. For example, each functional unit may be divided according to each function, and two or more functions may be integrated in one processing unit. The above-mentioned integrated unit can be implemented in the form of hardware or software functional units. It should be noted that the division of units in the implementations of the present disclosure is schematic, and is merely a logical function division, and there may be other division manners in actual implementation.

It should be noted that, for the sake of simplicity, the foregoing method implementations are described as a series of action combinations, however, it will be appreciated by those skilled in the art that the disclosure is not limited by the sequence of actions described. According to the disclosure, certain steps or operations may be performed in other order or simultaneously. Besides, it will be appreciated by those skilled in the art that the implementations described in the specification are exemplary implementations and the actions and modules involved are not necessarily essential to the disclosure.

In the foregoing implementations, the description of each implementation has its own emphasis. For the parts not described in detail in one implementation, reference may be made to related descriptions in other implementations.

In implementations provided in the disclosure, it should be understood that, the apparatus disclosed in implementations provided herein may be implemented in other manners. For example, the device/apparatus implementations described above are merely illustrative; for instance, the division of the unit is only a logical function division and there can be other manners of division during actual implementations, for example, multiple units or components may be combined or may be integrated into another system, or some features may be ignored, omitted, or not performed. In addition, coupling or communication connection between each illustrated or discussed component may be direct coupling or communication connection, or may be indirect coupling or communication among devices or units via some interfaces, and may be electrical connection, mechanical connection, or other forms of connection.

The units described as separate components may or may not be physically separated, the components illustrated as units may or may not be physical units, that is, they may be in the same place or may be distributed to multiple network elements. All or part of the units may be selected according to actual needs to achieve the purpose of the technical solutions of the implementations.

In addition, the functional units in various implementations of the disclosure may be integrated into one processing unit, or each unit may be physically present, or two or more units may be integrated into one unit. The above-mentioned integrated unit can be implemented in the form of hardware or a software function unit.

The integrated unit may be stored in a computer-readable memory when it is implemented in the form of a software functional unit and is sold or used as a separate product. Based on such understanding, the technical solutions of the disclosure essentially, or the part of the technical solutions that contributes to the related art, or all or part of the technical solutions, may be embodied in the form of a software product which is stored in a memory and includes instructions for causing a computer device (which may be a personal computer, a server, or a network device and so on) to perform all or part of the steps described in the various implementations of the disclosure. The memory includes various medium capable of storing program codes, such as a universal serial bus (USB) flash disk, a ROM, a RAM, a removable hard disk, disk, compact disc (CD), or the like.

It will be understood by those of ordinary skill in the art that all or a part of the various methods of the implementations described above may be accomplished by means of a program to instruct associated hardware, the program may be stored in a computer-readable memory, which may include a flash memory, a ROM, a RAM, disk or compact disc (CD), and so on.

A method for physical downlink data channel (PDSCH) resource determination and related products are disclosed in implementations of the disclosure. By unifying the confirmation of PDSCH resources by user equipment (UE) and a base station, the consistency between the UE and the network device is effectively realized, and the network performance is improved.

In a first aspect, a method for PDSCH resource determination is provided. The method is applied to a UE and includes: resources of n PDCCHs and demodulation reference signal (DMRS) resource sets associated with the n PDCCHs are not to be used for a PDSCH, if the PDSCH is scheduled by the n PDCCH, at least one PDCCH among the n PDCCHs is detected by the UE, and the PDSCH overlaps with at least one control resource set (CORESET) resource among CORESET resource(s) associated with the n PDCCHs, where n is an integer greater than or equal to 2.

In a second aspect, an apparatus for PDSCH resource determination is provided. The apparatus includes a processing unit. The processing unit is configured to not use resources of n PDCCHs and DMRS resource sets associated with the n PDCCHs for a PDSCH, if the PDSCH is scheduled by the n PDCCH, at least one PDCCH among the n PDCCHs is detected, and the PDSCH overlaps with at least one CORESET resource among CORESET resource(s) associated with the n PDCCHs.

In a third aspect, a terminal is provided. The terminal includes a processor, a memory, and a communication interface. The memory is configured to store one or more programs. The one or more programs are configured to be executed by the processor. The programs include instructions for performing the method described in the first aspect.

In a fourth aspect, a computer-readable storage medium is provided. The computer-readable storage medium stores computer programs for electronic data exchange. The computer programs are operable with a computer to perform the method described in the first aspect.

In a fifth aspect, a computer program product is provided. The computer program product includes a non-transitory computer-readable storage medium storing computer programs. The computer programs are operable with a computer to perform some or all of the steps described in the first aspect of implementations of the disclosure. The computer program product may be a software installation package.

In a sixth aspect, a chip system is provided. The chip system includes at least one processor, a memory, and an interface circuit. The memory, the transceiver, and the at least one processor are interconnected through lines. The at least one memory is configured to store computer programs. The computer programs are operable with the processor to perform the method described in the first aspect.

In the technical solution provided in the disclosure, when the PDSCH is scheduled by the n PDCCHs, the UE can detect at least one PDCCH among the n pieces of PDCCH scheduling, and the PDSCH overlaps with at least one CORESET resource among the CORESET resources associated with the n PDCCHs, then the resources of the n PDCCHs and the DMRS resource sets associated with the n PDCCHs are not to be used for the PDSCH. That is, a resource as illustrated in FIG. 2B is to be used for the PDSCH. In the technical solution of the disclosure, the resources of the n PDCCHs and the DMRS resource sets associated with the n PDCCHs are not to be used regardless of which PDCCH or PDCCHs among the n pieces of PDCCH scheduling is detected. Therefore, the resource to be used for the PDSCH is uniquely determined. That is, the resource as illustrated in FIG. 2B is to be adopted. In this way, the cognition inconsistency between the UE and the base station device can be avoided, and the network performance can be improved.

What is claimed is:

1. A method for physical downlink shared channel (PDSCH) resource determination, being applied to user equipment (UE) and comprising:

not using resources of a plurality of physical downlink control channels (PDCCHs) and demodulation reference signal (DMRS) resource sets associated with the plurality of PDCCHs for a PDSCH, if the PDSCH is scheduled by the plurality of PDCCHs and at least one PDCCH among the plurality of PDCCHs is detected by the UE as well as the PDSCH overlaps with at least one control resource set (CORESET) resource among one or more CORESET resources associated with the plurality of PDCCHs.

2. The method of claim 1, wherein the PDSCH overlapping with the at least one CORESET resource among the one or more CORESET resources associated with the plurality of PDCCHs specifically comprises:

the PDSCH overlapping with one CORESET resource in CORESETs associated with the plurality of PDCCHs, and the PDSCH not overlapping with remaining CORESET resources in the CORESETs associated with the plurality of PDCCHs.

3. The method of claim 2, wherein the at least one PDCCH among the plurality of PDCCHs being detected by the UE specifically comprising:

one PDCCH among the plurality of PDCCHs being detected by the UE, and remaining PDCCHs among the plurality of PDCCHs being not detected by the UE.

4. The method of claim 1, wherein the PDSCH overlapping with the at least one CORESET resource among the one or more CORESET resources associated with the plurality of PDCCHs specifically comprises:

the PDSCH overlapping with the one or more CORESET resources associated with the plurality of PDCCHs.

5. The method of claim 4, wherein the at least one PDCCH among the plurality of PDCCHs being detected by the UE specifically comprising:

one PDCCH among the plurality of PDCCHs being detected by the UE, and remaining PDCCHs among the plurality of PDCCHs being not detected by the UE.

6. A user equipment (UE), comprising:

a processor;

a memory; and a communication interface, wherein the memory is configured to store one or more programs, and the processor is configured to invoke and execute the one or more programs to:

not use resources of a plurality of physical downlink control channels (PDCCHs) and demodulation reference signal (DMRS) resource sets associated with the plurality of PDCCHs for a physical downlink shared channel (PDSCH), if the PDSCH is scheduled by the plurality of PDCCHs and at least one PDCCH among the plurality of PDCCHs is detected by the UE as well as the PDSCH overlaps with at least one control resource set (CORESET) resource among one or more CORESET resources associated with the plurality of PDCCHs.

7. A non-transitory computer-readable storage medium storing computer programs which are operable with a computer to:

not use resources of a plurality of physical downlink control channels (PDCCHs) and demodulation reference signal (DMRS) resource sets associated with the plurality of PDCCHs for a physical downlink shared channel (PDSCH), if the PDSCH is scheduled by the plurality of PDCCHs and at least one PDCCH among the plurality of PDCCHs is detected as well as the PDSCH overlaps with at least one control resource set (CORESET) resource among one or more CORESET resources associated with the plurality of PDCCHs.

8. The method of claim 2, wherein the at least one PDCCH among the plurality of PDCCHs being detected by the UE specifically comprises:

all PDCCHs among the plurality of PDCCHs being detected by the UE.

9. The method of claim 4, wherein the at least one PDCCH among the plurality of PDCCHs being detected by the UE specifically comprises:

all PDCCHs among the plurality of PDCCHs being detected by the UE.

10. The UE of claim 6, wherein the PDSCH overlapping with the at least one CORESET resource among the one or more CORESET resources associated with the plurality of PDCCHs specifically comprises:

the PDSCH overlapping with one CORESET resource in CORESETs associated with the plurality of PDCCHs, and the PDSCH not overlapping with remaining CORESET resources in the CORESETs associated with the plurality of PDCCHs.

11. The UE of claim 10, wherein one PDCCH among the plurality of PDCCHs is detected by the processor, and remaining PDCCHs among the plurality of PDCCHs is not detected by the processor.

12. The UE of claim 10, wherein all PDCCHs among the plurality of PDCCHs are detected by the processor.

13. The UE of claim 6, wherein the PDSCH overlapping with the at least one CORESET resource among the one or more CORESET resources associated with the plurality of PDCCHs specifically comprises:

the PDSCH overlapping with the one or more CORESET resources associated with the plurality of PDCCHs.

14. The UE of claim 13, wherein one PDCCH among the plurality of PDCCHs is detected by the processor, and remaining PDCCHs among the plurality of PDCCHs is not detected by the processor.

15. The UE of claim 13, wherein all PDCCHs among the plurality of PDCCHs are detected by the processor.

16. The non-transitory computer-readable storage medium of claim 7, wherein the PDSCH overlapping with the at least one CORESET resource among the one or more CORESET resources associated with the plurality of PDCCHs specifically comprises:

the PDSCH overlapping with one CORESET resource in CORESETs associated with the plurality of PDCCHs, and the PDSCH not overlapping with remaining CORESET resources in the CORESETs associated with the plurality of PDCCHs.

17. The non-transitory computer-readable storage medium of claim 16, wherein one PDCCH among the plurality of PDCCHs is detected, and remaining PDCCHs among the plurality of PDCCHs are not detected.

18. The non-transitory computer-readable storage medium of claim 16, wherein all PDCCHs among the plurality of PDCCHs are detected.

19. The non-transitory computer-readable storage medium of claim 7, wherein the PDSCH overlapping with the at least one CORESET resource among the one or more CORESET resources associated with the plurality of PDCCHs specifically comprises:

the PDSCH overlapping with the one or more CORESET resources associated with the plurality of PDCCHs.

20. The non-transitory computer-readable storage medium of claim 19, wherein one PDCCH among the plurality of PDCCHs is detected, and remaining PDCCHs among the plurality of PDCCHs are not detected.

* * * * *